United States Patent
Kwon et al.

(10) Patent No.: US 7,831,274 B2
(45) Date of Patent: Nov. 9, 2010

(54) BASE STATION FOR EXCHANGING FREQUENCY BANDS

(75) Inventors: Tae Soo Kwon, Hwaseong-si (KR); Woongsup Lee, Daejeon (KR); Kyung Hun Jang, Suwon-si (KR); Ohyun Jo, Cheongju-si (KR); Ki Song Lee, Hwaseong-si (KR); Dong Ho Cho, Seoul (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 176 days.

(21) Appl. No.: 12/266,045

(22) Filed: Nov. 6, 2008

(65) Prior Publication Data

US 2009/0323603 A1     Dec. 31, 2009

(30) Foreign Application Priority Data

Jun. 30, 2008    (KR) ...................... 10-2008-0063030

(51) Int. Cl.
     *H04B 7/00*      (2006.01)
(52) U.S. Cl. .................................... 455/524; 369/275.3
(58) Field of Classification Search ...................... None
See application file for complete search history.

(56) References Cited

U.S. PATENT DOCUMENTS

| | | | |
|---|---|---|---|
| 4,975,939 A | 12/1990 | Sasaki | |
| 5,113,416 A | 5/1992 | Lindell | |
| 6,032,046 A | 2/2000 | Nakano | |
| 2008/0031197 A1 | 2/2008 | Wang et al. | |

FOREIGN PATENT DOCUMENTS

| | | | |
|---|---|---|---|
| JP | 2002-271845 A | 9/2002 |
| JP | 2005-026816 A | 1/2005 |
| KR | 10-2006-0129807 A | 12/2006 |
| KR | 10-2007-0078449 A | 8/2007 |
| KR | 10-2007-0112701 A | 11/2007 |
| KR | 10-2007-0117140 A | 12/2007 |

*Primary Examiner*—Paul Huber
(74) *Attorney, Agent, or Firm*—NSIP Law

(57) ABSTRACT

An apparatus and method for exchanging frequency bands used by a plurality of base stations are provided. A base station for exchanging frequency bands includes a receiving unit to receive first quiet time duration information of an adjacent base station, a frequency band measuring unit to determine first frequency band measuring information with respect to a first frequency band used by the adjacent base station based on the first quiet time duration information, a frequency band exchange-determining unit to determine whether to exchange frequency bands with each other based on the first frequency band measuring information, and a transmitting unit to transmit data to a terminal using the first frequency band according to the determined result.

17 Claims, 6 Drawing Sheets

BASE STATION FOR EXCHANGING FREQUENCY BANDS

CROSS-REFERENCE TO RELATED APPLICATION

This application claims the benefit under 35 U.S.C. §119 (a) of a Korean Patent Application No. 10-2008-0063030, filed on Jun. 30, 2008 in the Korean Intellectual Property Office, the entire disclosure of which is incorporated herein by reference.

TECHNICAL FIELD

The following description relates to a radio communication, and more particularly, to an apparatus and method for exchanging frequency bands among a plurality of base stations.

BACKGROUND

A general radio communication network may include a plurality of base stations. Terminals transmitting data through the radio communication network may select any one of the plurality of base stations included in the radio communication network and connect with the selected base station. The terminal may transmit data to the connected base station, and each of base stations may transmit the received data to a destination.

For the purpose of transmitting data, frequency bands are assigned to each of the base stations, and terminals connected with each of the base stations transmit data to each of the base stations based on the assigned frequency band. Interference between the adjacent base stations may occur where the same frequency is assigned to the adjacent base stations, and thus different frequency bands are assigned thereto. In order to suppress occurrence of interference signals between the different frequency bands, guard bands may be set between each of the frequency bands.

A data traffic of the radio communication network may vary according to time and location. A new base station may be newly established in an area where requests for data traffic rapidly increase, and frequency bands may be assigned to the new base station, so that the requests for data traffic which may change at any moment may be satisfied. The new base station may receive assignments of the frequency bands which are not used by the adjacent base stations. Where the frequency bands are assigned to the new base station in response to an increase in the requests for data traffic, assignments of optimum frequency bands to each of the base stations may fail.

For example, a specific base station may transmit data to a terminal using a plurality of frequency bands separated from each other. The use of a plurality of frequency bands divided into guard bands may inevitably incur a reduction in frequency utilization efficiency.

SUMMARY

In one general aspect, there is provided an apparatus and method for exchanging frequency bands, used by two adjacent base stations, with each other.

In another general aspect, there is provided an apparatus and method for exchanging frequency bands which may eliminate guard bands for dividing frequency bands used by each base station.

In still another general aspect, there is provided an apparatus and method for exchanging frequency bands which may compare an amount of interference of a base station and an amount of interference of the adjacent base stations to assign an optimum frequency band to the base station and the adjacent base stations.

In yet another general aspect, there is provided an apparatus and method for exchanging frequency bands which may effectively manage frequency bands by exchanging frequency bands between the adjacent base stations without using a centralized frequency band managing apparatus.

In yet another general aspect, a base station for exchanging frequency bands includes a receiving unit to receive first quiet time duration information of an adjacent base station, a frequency band measuring unit to determine first frequency band measuring information with respect to a first frequency band used by the adjacent base station based on the first quiet time duration information, a frequency band exchange-determining unit to determine whether to exchange frequency bands with each other based on the first frequency band measuring information, and a transmitting unit to transmit data to a terminal using the first frequency bands according to the determined result.

The frequency band measuring unit may measure strengths of interference and noise with respect to the first frequency band for a first quiet time duration.

The transmitting unit may transmit a request message for quiet time duration information to the adjacent base station, and a first quiet time duration may be set in response to the request message.

The frequency band exchange-determining unit may compare the first frequency band measuring information with a threshold value, and determine whether to exchange the frequency bands of the base station and the adjacent base station based on the compared result.

The frequency band measuring unit may determine second frequency band measuring information with respect to a second frequency band used by the base station, and the frequency band exchange-determining unit may compare the first and second frequency band measuring information to determine whether to exchange the frequency bands with each other.

The frequency band exchange-determining unit may determine to exchange the first frequency band with the second frequency band where the first frequency band and a third frequency band are adjacent to each other, the third frequency band is being used by the base station, and the second frequency band and the third frequency band are spaced apart from each other.

The transmitting unit may transmit, to the adjacent base station, a request message for the frequency band exchange according to the determined result, the receiving unit may receive a frequency band exchange message in response to the request message for the frequency band exchange, and the transmitting unit may transmit the data based on the frequency band exchange message.

The request message for the frequency band exchange may include second quiet time duration information of the base station, and the frequency band exchange message may be generated based on the second quiet time duration information.

The base station may further comprise a control unit to set a second quiet time duration with respect to a second frequency band used by the base station, wherein the transmitting unit may prevent data from being transmitted using the second frequency band for the second quiet time duration, to a second terminal.

The control unit may set the second quiet time duration in order to prevent the first quiet time duration and the second quiet time duration from being overlapped with each other.

In yet another general aspect, a method for exchanging frequency bands includes receiving first quiet time duration information of an adjacent base station, determining first frequency band measuring information with respect to a first frequency band used by the adjacent base station based on the first quiet time duration information, determining whether to exchange frequency bands with each other based on the first frequency band measuring information, and transmitting data to a terminal using the first frequency band according to the determined result.

The determining may comprise measuring strengths of interference and noise with respect to the first frequency band for a first quiet time duration.

The determining whether to exchange may comprise comparing the first frequency band measuring information with a threshold value, and determining whether to exchange the frequency bands of the base station and the adjacent base station according to the compared result.

The method may further comprise determining second frequency band measuring information with respect to a second frequency band for transmitting data to the terminal, wherein the determining whether to exchange may comprise comparing the first and second frequency band measuring information with each other to determine whether to exchange the frequency bands with each other.

In yet another general aspect, there is provided a computer-readable storage medium readable by a computer, having a data frame including a data transmitting duration region to transmit first data to a first terminal using a first frequency band, and a quiet time duration region to prevent the first data from being transmitted to the first terminal by a base station, wherein the quiet time duration region is used for measuring strengths of interference and noise with respect to the first frequency band by an adjacent base station of the base station transmitting second data to a second terminal using a second frequency band.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, unless otherwise described, the same drawing reference numerals will be understood to refer to the same elements, features, and structures. The elements may be exaggerated for clarity and convenience.

DETAILED DESCRIPTION

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. Also, description of well-known functions and constructions are omitted to increase clarity and conciseness.

Figure 1A:
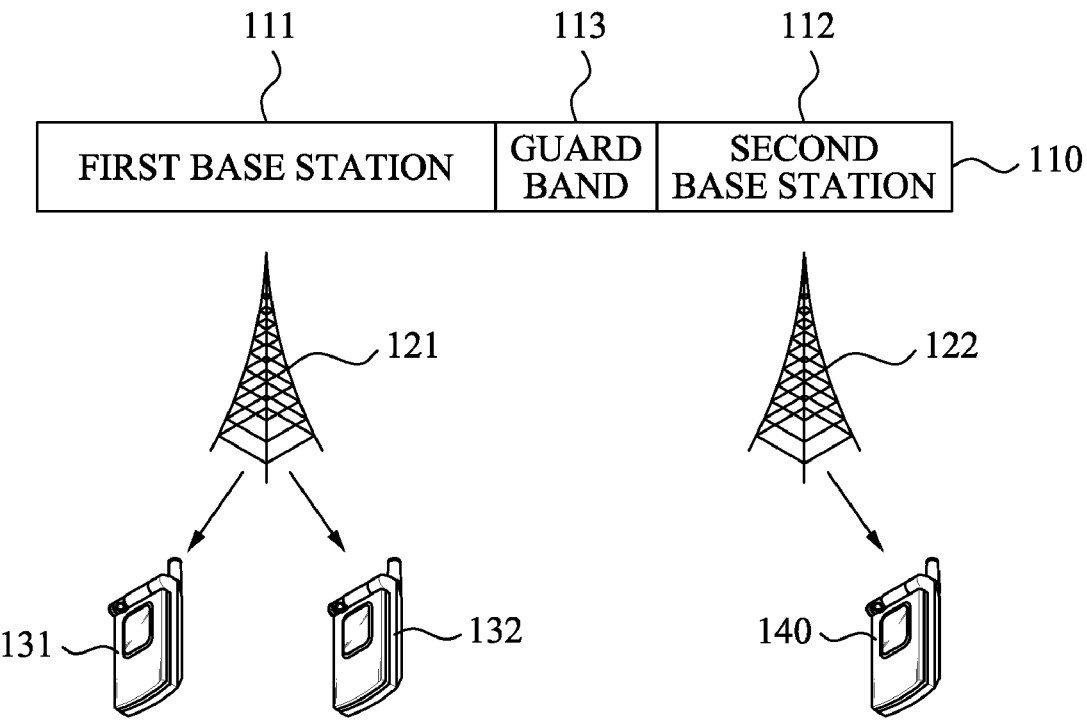
FIGS. 1A and 1B are conceptual diagrams illustrating a state where frequency bands used by a plurality of base stations are exchanged with each other according to an exemplary embodiment.
Figure 1B:
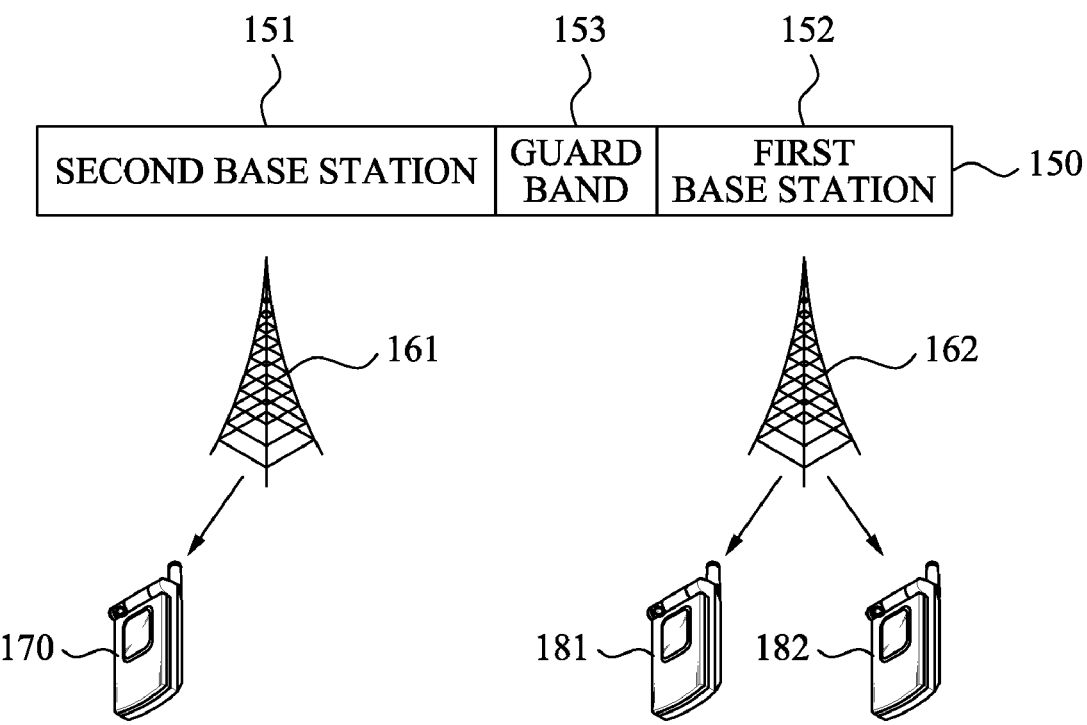

FIGS. 1A and 1B illustrate a state where frequency bands, used by a plurality of base stations, are exchanged with each other according to an exemplary embodiment. The concept in which the frequency bands used by the plurality of base stations are exchanged with each other according to an exemplary embodiment will be herein described in detail with reference to FIGS. 1A and 1B.

A first base station 121 transmits data to a first terminal 131 and a second terminal 132, respectively, and a second base station 122 transmits data to a third terminal 140. The first base station 121 transmits data to terminals 131 and 132 using a first frequency band 111 of a frequency band 110 assigned to a radio communication system, for example, the entire radio communication system. The second base station 122 transmits data to the third terminal 140 using the second frequency band 112 of the frequency band 110 assigned to the radio communication system.

According to an aspect, each of the frequency bands 111 and 112 may be divided by a guard band 113. The guard band 113 is a frequency band unused by any one of the first and second base stations 121 and 122.

Signals of the first frequency band 111 may act as interference signals in the second frequency band 112, and vice versa, where, for example, the first frequency band 111 and the second frequency band 112 are assigned to be close to each other. Therefore, performance of the radio communication system may be deteriorated.

Where each of the frequency bands 111 and 112 is divided by the guard band 113 as illustrated in FIG. 1, the signals of the first frequency band 111 may not act as the interference signals in the second frequency band 112. In this case, performance of the radio communication system may not be deteriorated.

According to an aspect, the first frequency band 111 assigned to the first base station 121 may be larger than the second frequency band 112 assigned to the second base station 122. Where a data traffic of the first base station 121 is greater than that of the second base station 122, such assignments of the frequency bands 110 may be effective.

A data traffic of each of the base stations 121 and 122 may vary over time. For example, a handover is performed to the second base station 122 by the second terminal 132 connected with the first base station 121, and data is transmitted to the second base station 122. Where the data traffic of the second base station 122 is greater than that of the first base station 121, assignments of the existing frequency bands 110 may not be effective any more.

As another example, a third base station may be installed in the vicinity of the first base station 121 in order to reduce data traffic of the first base station 121. In this case, a part of the terminals 131 and 132 having transmitted data to the first base station 121 transmits data to the third base station, and data traffic of the first base station 121 is reduced. Where the data traffic of the first base station 121 is reduced, the first base station 121 may not need to use the full frequency band 111.

According to an exemplary embodiment, the first and second base stations 121 and 122 may exchange assigned frequency bands with each other. Referring to FIG. 1B, an exchanged frequency band 150 may comprise a first frequency band 151, a second frequency band 152, and a guard band 153. Since the frequency bands used by the first and second base station 161 and 162 are exchanged with each other, the first base station 161 transmits data to a first terminal 170 using the second frequency band 152. Also, the second base station 162 transmits data to second and third terminals 181 and 182 using the first frequency band 151.

Since the first frequency band 151 is larger than the second frequency band 152, the exchanged frequency band 150 may be an optimum frequency band based on the changed data traffic.

According to an exemplary embodiment, the frequency bands assigned to each of the base stations may be changed depending on change in the data traffic. Accordingly, frequency bands assigned to a radio communication system may be used more effectively.

According to another exemplary embodiment, each of the base stations 121 and 122 may exchange the frequency bands with each other based on an amount of interference signals in each of the assigned frequency bands. For example, the first base station 121 may measure an amount of interference signals in the first and second frequency bands 111 and 112. The first base station 121 may determine, based on the measured result, whether performance of a data transmission system including the first and second base stations 121 and 122 is improved where the first base station 121 uses the second frequency band 112 and the second base station 122 uses the first frequency band 111.

As an illustration only, the first and second base stations 121 and 122 are illustrated in FIG. 1A. However, according to an exemplary embodiment, a plurality of base stations placed in different locations may use or reuse an identical frequency band. For example, a third base station may use or reuse the first frequency band 111 used by the first base station 121. The first base station 121 may receive interference signals from the third base station using an identical frequency band, even though the first base station 121 and the third base station are spaced far from each other. Also, the interference signals from the third base station may reduce data transmission/reception performance of the first base station 121.

According to an exemplary embodiment, the first base station 121 may exchange the frequency bands with the second base station 122, so as to reduce the interference signals from the third base station. Since the first base station 121 uses the second frequency band 112 upon exchange of the frequency bands, the first base station 121 may not receive the interference signals from the third base station using the first frequency band 111. The second base station 122 uses the first frequency band 111, however, a strength of the interference signals from the third base station may be reduced.

That is, the strength of the interference signals from the third base station may be reduced where a distance from the third station to the second base station 122 is greater than that from the third base station to the first base station 121.

According to an exemplary embodiment, the frequency bands may be re-assigned based on an amount of interference from the adjacent base stations with respect to each of the frequency bands 111 and 112.

Figure 2A:
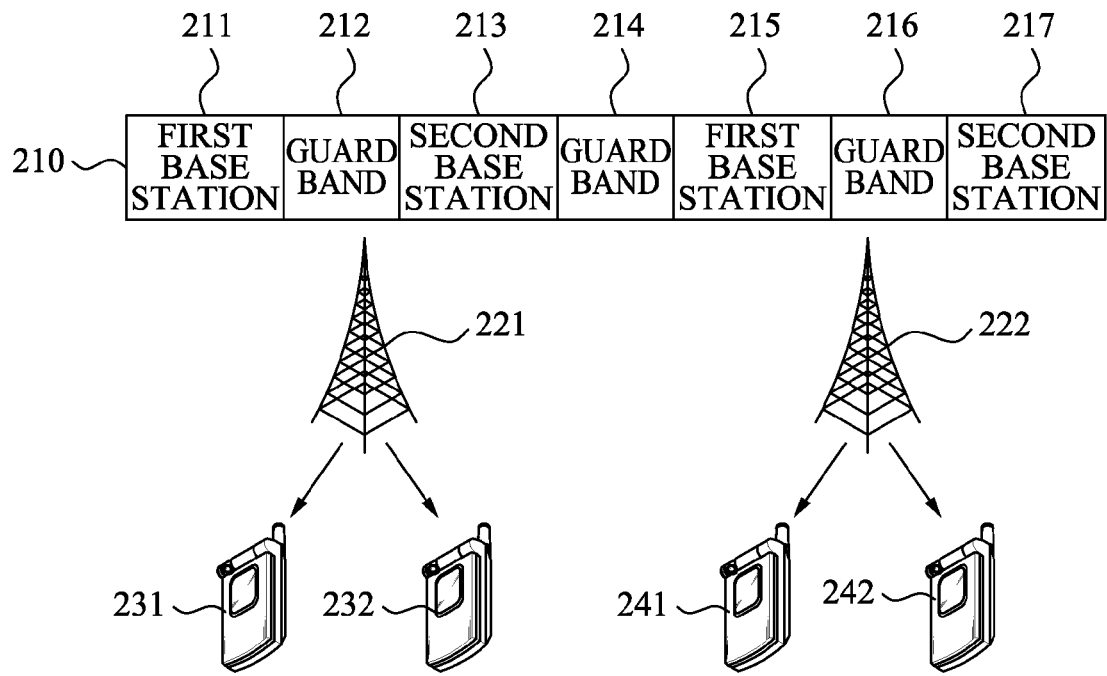
FIGS. 2A and 2B are conceptual diagrams illustrating a case where frequency bands used by a plurality of base stations are exchanged with each other according to another exemplary embodiment.
Figure 2B:
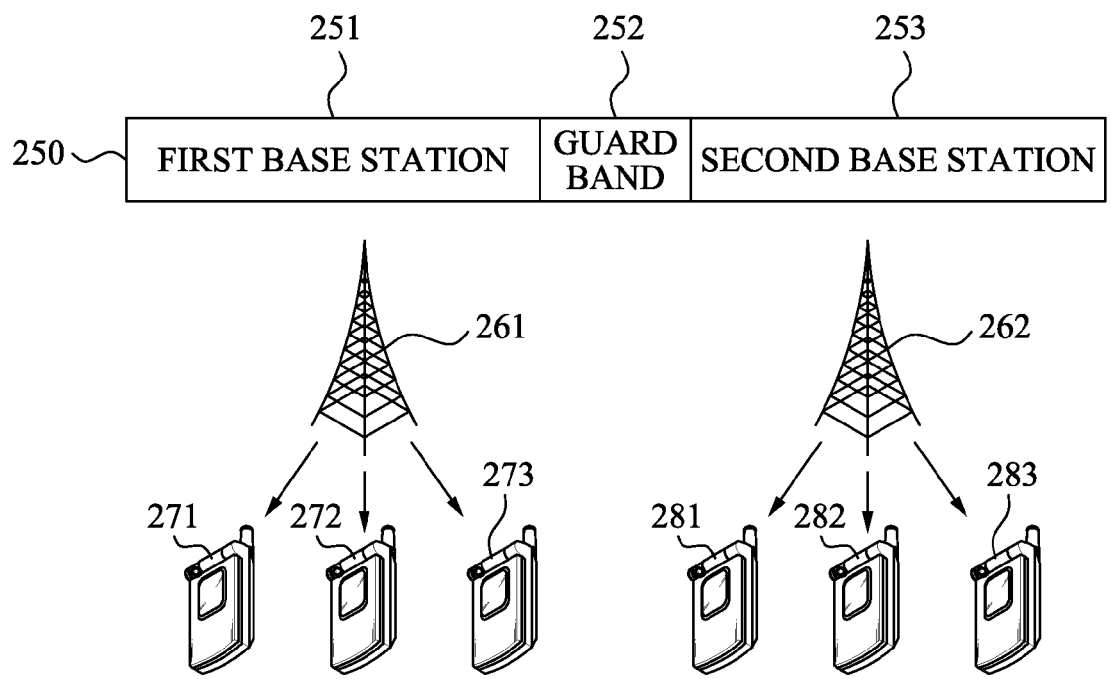

FIGS. 2A and 2B illustrate a case where frequency bands used by a plurality of base stations are exchanged with each other according to an exemplary embodiment. A concept in which the frequency bands used by the plurality of base stations are exchanged with each other according to the exemplary embodiment will be herein described with reference to FIGS. 2A and 2B.

According to an exemplary embodiment, frequency bands between adjacent base stations 221 and 222 are exchanged with each other without using a centralized frequency band managing apparatus, so as to readily manage the frequency bands.

A data traffic, frequency band efficiency, and the like of each of the base stations 221 and 222 may vary at any moment due to movement of terminals 231, 232, 241, and 242 transmitting data to each of the base stations 221 and 222, changes in services utilized by the terminals, and the like. In order to cope with the above-described variation in the data traffic, a small base station may be occasionally installed and removed. A frequency band 210 of a data transmission system including the first and second base stations 221 and 222 may be fragmented, where a process where the frequency band is assigned to the small base station and the assigned frequency band is withdrawn is repeatedly performed.

A centralized frequency band managing apparatus may be ineffective where a base station is occasionally installed and removed in response to the change in the data traffic. For example, to manage, by the centralized frequency band managing apparatus, assignment and withdrawal of frequency resources with respect to the small base station occasionally installed may be difficult. According to an exemplary embodiment, effective management of the frequency resources may be implemented by exchanging the frequency bands between the adjacent base stations.

The first base station 221 transmits data to the first and second terminals 231 and 232, and the second base station 222 transmits data to the third and fourth terminals 241 and 242.

According to an exemplary embodiment, consecutive frequency bands may be assigned to the first and second base stations 221 and 222.

For example, the first and second frequency bands 211 and 213 may be assigned to the first base station 221, and the third and fourth frequency bands 215 and 217 may be assigned to the second base station 222. Where the first and second frequency bands 211 and 213 are assigned to the first base station 221, a guard band 212 for dividing the first and second frequency bands 221 and 213 may not need to be set. Also, where the third and fourth frequency bands 215 and 217 are assigned to the second base station 222, a guard band 216 for dividing the third and fourth frequency bands 215 and 217 may not need to be set. However, a guard band 214 for dividing the second frequency band 213 assigned to the first base station 221 and the third frequency band 215 assigned to the second base station 222 may need to be set.

Referring to FIG. 2A, the frequency bands 211 and 215 used for transmitting data by the first base station 221 may be inconsecutively assigned. Also, the frequency bands 213 and 217 used for transmitting data by the second base station 222 may also be inconsecutively assigned.

The frequency bands 211, 213, 215, and 217 consecutively assigned to each of the base stations 221 and 222 may be inconsecutively assigned to each of the base stations 221 and 222 according to an operation of a radio communication system.

For example, the frequency bands may be inconsecutively assigned where a new base station is added to the radio communication system. Where a third base station is added to the radio communication system illustrated in FIG. 2A, the frequency band 215 may be assigned to the third base station as the third frequency band 215. Where the third base station is removed, the third frequency band 215 may be assigned to the first base station 221 or the second base station 222 depending on the data traffic of the first and second base stations 221 and 222. Where the data traffic of the first base station 221 is greater than that of the second base station 222, the third frequency band 215 may be assigned to the first base station 221 and vice versa.

In a same manner, where a fourth base station is added to the radio communication system illustrated in FIG. 2A, the second frequency band 213 may be assigned to the second base station 222.

Where inconsecutive frequency bands are assigned to each of the base stations 221 and 222, guard bands 212, 214, and 216 for dividing each of the frequency bands 211, 213, 215, and 217 may be required to be set, in which the guard band 214 is for dividing the second and third frequency bands 213 and 215 and the guard band 216 is for dividing the third and fourth frequency bands 215 and 217.

Where the inconsecutive frequency bands 211, 213, 215, and 217 are assigned to each of the base stations 221 and 222, a number of the guard bands 212, 214, and 216 for dividing each of the frequency bands 211, 213, 215, and 217 may be more than in the case of consecutive frequency bands. The guard bands 212, 214, and 216 are frequency bands unused by the radio communication system. Thus, the frequency utilization efficiency of the radio communication system may be reduced along with an increase in the number of guard bands 212, 214, and 216.

According to an exemplary embodiment, the first and second base stations 221 and 222 may exchange the frequency bands currently used with each other. For example, the first base station 221 may exchange the third frequency band 215 with the second frequency band 213 used by the second base station 222. Referring to FIG. 2B, according to a frequency band 250 after the exchange, the first base station 221 may use the second frequency band 213 and the second base station 222 may use the third frequency band 215.

The guard band 212 for dividing the first and second frequency bands 211 and 213 may not be required to be set since the first base station 221 uses the first and second frequency bands 211 and 213. Also, the guard band 216 for dividing the third and fourth frequency bands 215 and 217 may not be required to be set since the second base station 222 uses the third and fourth frequency bands 215 and 217.

Since the guard bands 212 and 216 may not be require to be set when comparing the frequency bands 210 and 250 before and after the exchange, the frequency utilization efficiency of the radio communication system may be improved. Also, consecutive frequency bands 251 and 253 are assigned to each of base stations 261 and 262 for terminals 271, 272, 273, 281, 282, and 283, and thus readily managing the frequency bands.

According to an exemplary embodiment, fragmented frequency bands may be exchanged with each other between the adjacent base stations to assign the consecutive frequency bands to each of the base stations.

Figure 3:
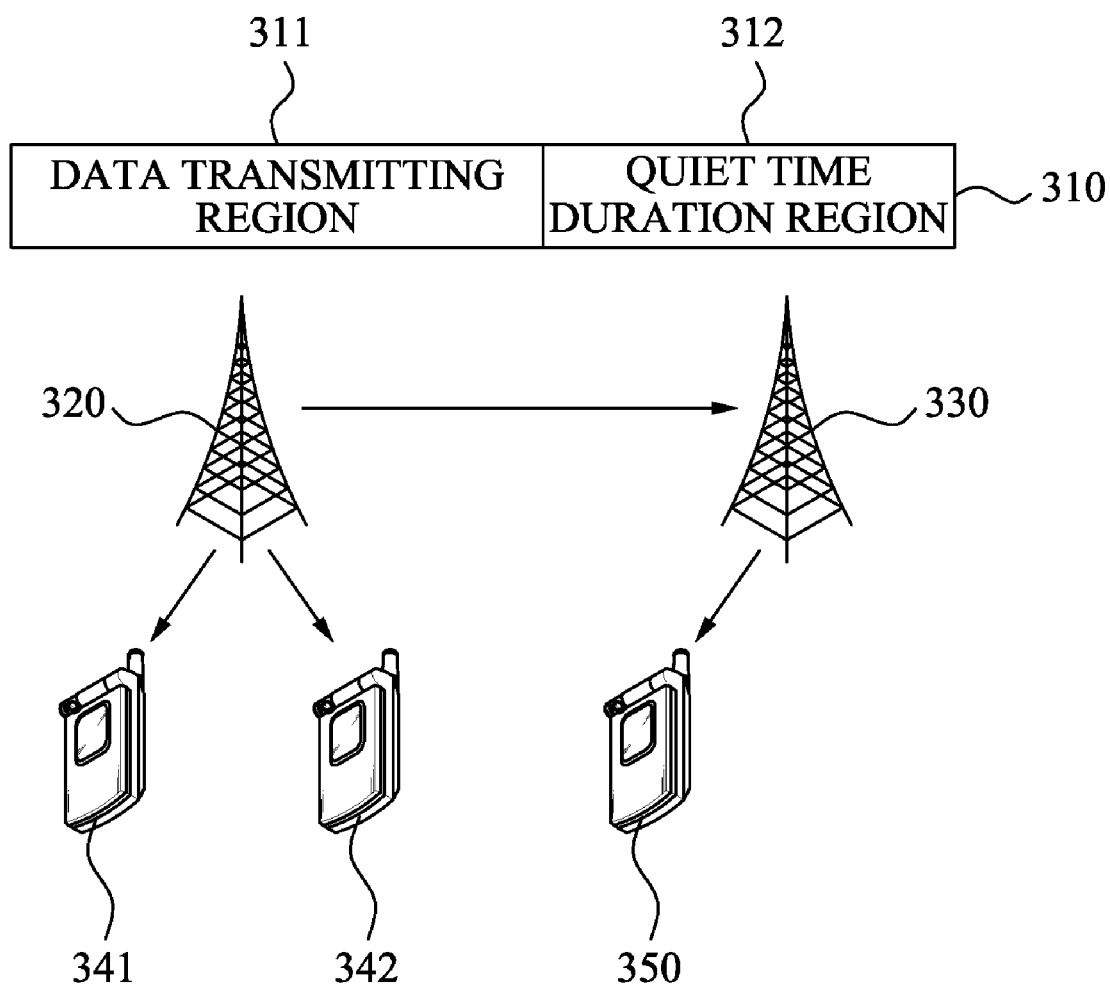
FIG. 3 is a conceptual diagram illustrating a state where frequency band measuring information with respect to frequency bands used by a first base station is outputted for a quiet time duration of the first base station according to an exemplary embodiment.

FIG. 3 illustrates a state where frequency band measuring information with respect to frequency bands used by a first base station is outputted for a quiet time duration of the first base station according to an exemplary embodiment. A concept where a second base station determines frequency band measuring information with respect to a frequency band used by a first base station for a quiet time duration of the first base station will be herein described with reference to FIG. 3.

A first base station 320 transmits data to first and second terminals 341 and 342, and a second base station 330 transmits data to a third terminal 350.

According to an exemplary embodiment, the second base station 330 may determine the frequency band measuring information with respect to the frequency band used by the first base station 320, and determine whether to exchange the frequency bands used by the first and second base station 320 and 330 with each other based on the frequency band measuring information.

The first and second base stations 320 and 330 may exchange frequency bands assigned to them where the performance of a radio communication system is improved, for example, by exchanging with each other a first frequency band assigned to the first base station 320 and a second frequency band assigned to the second base station 330.

The second base station 330 may determine whether the performance of the radio communication system is improved where the second base station uses the first frequency band instead of the second frequency band.

In a case of using a specific frequency band, the performance of the radio communication system may be expressed as a signal to interference and noise ratio (SINR) with respect to a specific frequency band. According to an aspect, the frequency band measuring information may be the SINR. According to an exemplary embodiment, the second base station 330 may determine the SINR with respect to each of the first and second frequency bands, and determine whether to exchange the first and second frequency bands with each other based on the SINR.

According to an aspect, the second base station 330 may determine a SINR with respect to strength of signals transmitted by the second base station 330. For example, the second base station 330 may determine a SINR in a case of transmitting data to a third terminal 350 using the first frequency band, and also determine a SINR in a case of transmitting data to the third terminal 350 using the second frequency band.

Strengths of signals for transmitting data to the third terminal 350 by the second base station 330 may be readily obtained. Accordingly, in order to determine the SINR, each of the strengths of the interference signal and noise may be measured.

Where the first base station 320 measures the first frequency band in a data transmission duration 311 transmitting data to a first terminal 341 or a second terminal 342, a value obtained by summing up strength of signals transmitting data by the first base station 320 using the first frequency band, strength of interference signals with respect to the first frequency band, and strength of noise of the first frequency band may be measured. Also, a ratio of strength of transmitting data by the first base station 320 using the first frequency band to strength of interference signals with respect to the first frequency band, and also strength of noise of the first frequency band thereto may be calculated.

However, in order to determine whether the second base station 330 exchanges the first frequency band with the second frequency band, a ratio of strength of signals transmitting data by the second base station 330 using the first frequency band to strength of interference signals with respect to the first frequency band and strength of noise of the first frequency band thereto may be required to be acquired. Accordingly, the second base station 330 may not determine to exchange the first frequency band with the second frequency band where the first frequency band is measured in the data transmission duration 311.

According to an aspect, the second base station 330 may measure the first frequency band in a quiet time duration 312 of the first base station 320. In this case, the first base station 320 may not transmit data in the quiet time duration 312. Accordingly, strength of the signal emitted by the first base station 320 may be '0'. Where the second base station 330 measures the first frequency band in the quiet time duration 312, the strength of the interference signals with respect to the first frequency band and the strength of the noise of the first frequency band may be measured.

The second base station 330 may readily acquire the strength of signals for transmitting data to the third terminal 350 by the second base station 330. Accordingly, the second base station 330 may readily acquire a ratio of the strength of interference signals with respect to the first frequency band to the strength of signals transmitting data by the second base station 330 using the first frequency band, and also a ratio of the strength of noise of the first frequency band thereto. This may be hereinafter referred to as a signal to interference and noise ratio (SINR) with respect to the first frequency band of the second base station 330.

In this way, the second base station 330 may measure the strength of interference signals with respect to the second frequency band and strength of noise of the second frequency band during a quiet time duration of the second base station 330. Accordingly, the second base station 330 may readily calculate a ratio of the strength of the interference signals with respect to the second frequency band to the strength of signals transmitting data by the second base station 330 using the second frequency band, and also a ratio of the strength of noise of the second frequency band thereto. This may be hereinafter referred to as a SINR with respect to the second frequency band of the second base station 330.

The second base station 330 may compare the SINR with respect to the first frequency band of the second base station 330 and the SINR with respect to the second frequency band of the second base station 330. The second base station 330 may determine to transmit data to the third terminal 350 using the first frequency band or the second frequency band based on the compared result.

The second base station 330 may transmit a request message for frequency band exchange to the first base station 320 based on the determined result. The first base station 320 receiving the request message for the frequency band exchange may calculate a SINR with respect to the first frequency band of the first base station 320 and a SINR with respect to the second frequency band of the first base station 320. The first base station 320 may compare the SINR with respect to the first frequency band and the SINR with respect to the second frequency band. The first base station 320 may exchange the first frequency band with the second frequency band based on the compared result.

According to an exemplary embodiment, the first base station 320 may determine to exchange the first frequency band with the second frequency band where the performance of the radio communication system is improved by exchanging the first frequency band with the second frequency band. According to an exemplary embodiment, the first base station 320 may determine to exchange the first frequency band with the second frequency band where the sum of data transmission rates of the first base station 320 and second base station 330 is relatively greater.

A data frame 310 used for transmitting data by the first base station 320 includes the data transmission duration 311 and the quiet time duration 312. The data transmission duration 311 is used for transmitting first data to the first terminal 341 or the second terminal 342 by the first base station 320 using the first frequency band. The first base station 320 may not transmit data to each of the terminals 341 and 342 during a quiet time duration corresponding to the quiet time duration 312. Accordingly, the first base station 320 may not emit radio waves to the first frequency band.

The second base station 330 may transmit data to the third terminal 350 using the second frequency band during a data transmission time duration corresponding to the data transmission duration 311. The second base station 330 may measure the strength of interference signals with respect to the first frequency band during the quiet time duration corresponding to the quiet time duration 312, and the strength of noise of the first frequency band.

The first base station 320 and the second base station 330 may exchange the first frequency band with the second frequency band based on the measured result with respect to the first frequency band of the second base station 330. The first base station 320 transmits first data to the first terminal 341 or the second terminal 342 using the second frequency band, and the second base station 330 transmits second data to the third terminal 350 using the first frequency band.

Figure 4:
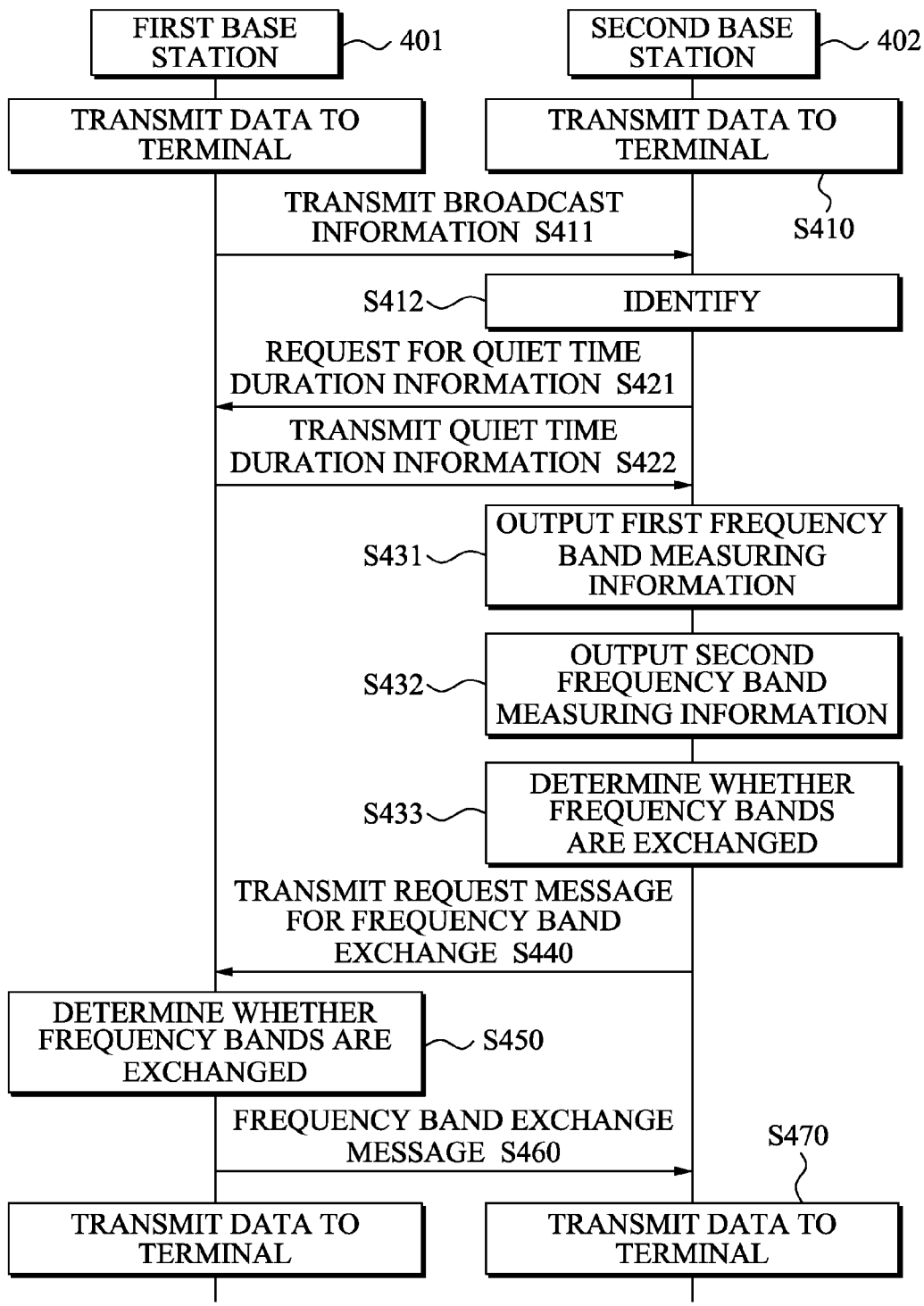
FIG. 4 is a flowchart illustrating a method for comparing first frequency band measuring information and second frequency band measuring information to determine whether to exchange frequency bands according to an exemplary embodiment.

FIG. 4 illustrates a method for comparing first frequency band measuring information and second frequency band measuring information to determine whether to exchange frequency bands with each other according to an exemplary embodiment. The method in which the first frequency band measuring information with respect to a first frequency band used by a first base station and the second frequency band measuring information with respect to a second frequency band used by a second base station are compared with each other to determine whether to exchange the frequency bands will be hereinafter described with reference to FIG. 4.

In operation S410, the first base station 401 transmits data to a first terminal using the first frequency band, and the second base station 402 transmits data to a second terminal using the second frequency band.

In operation S411, the first base station 410 may transmit broadcast information to the second base station 402. The second base station 402 may identify the first base station based on the broadcast information in operation S412.

In operation S421, the second base station 402 may transmit, to the first base station 401, a request message for quiet time duration information. In operation S422, the first base station 401 may transmit first quiet time duration information of the first base station 401 to the second base station 402.

The second base station 402 may receive, from a base station information storage apparatus, the first quiet time duration information of the first base station 401.

In operation S431, the second base station 402 may generate first frequency band measuring information with respect to the first frequency band. The first frequency band measuring information may be information about the strength of the interference signals with respect to the first frequency band or information about the strength of the noise of the first frequency band. The first base station 401 may not transmit data during the first quiet time duration. Since the first base station 401 may not emit radio waves to the first frequency band, the second base station 402 may accurately measure the strength of the interference signals with respect to the first frequency band and the strength of the noise of the first frequency band.

In operation S432, the second base station 402 may generate second frequency band measuring information with respect to the second frequency band. The second frequency band measuring information may be information about the strength of interference signals with respect to the second frequency band or the strength of noise of the second frequency band. The second base station 402 may not transmit data during the second quiet time duration, and may accurately measure the strength of interference signals with respect to the second frequency band and the strength of noise of the second frequency band.

In operation S433, the second base station 402 may determine whether to exchange the first frequency band and the second frequency band with each other. The second base station 402 may compare the first frequency band measuring information and the second frequency band measuring information, and determine whether to exchange the first frequency band with the second frequency band based on the compared result.

In operation S440, the second base station 402 may transmit a request message for frequency band exchange to the first base station 401. The request message for frequency band exchange may include the first frequency band measuring information measured by the second base station 402 and the second frequency band measuring information measured by the second base station 402.

In operation S450, the first base station 401 may determine whether to exchange the first frequency band and the second frequency band with each other. The first base station 401 may determine whether to exchange the first frequency band with the second frequency band based on the first and second frequency band measuring information each being measured by the second base station 402 which are included in the request message for the frequency band exchange.

The first base station 401 may measure the first frequency band or the second frequency band to generate first frequency band measuring information measured by the first base station 401 and second frequency band measuring information measured by the first base station 401. The first base station 401 may determine whether to exchange the first frequency band and the second frequency band with each other based on the generated frequency band measuring information.

In operation S460, the first base station 401 may transmit a frequency band exchange message to the second base station 402.

In operation S470, the first base station 401 and the second base station 402 may exchange the first frequency band with the second frequency band. The first base station 401 transmits data to the first terminal using the second frequency band, and the second base station 402 transmits data to the second terminal using the first frequency band.

Figure 5:
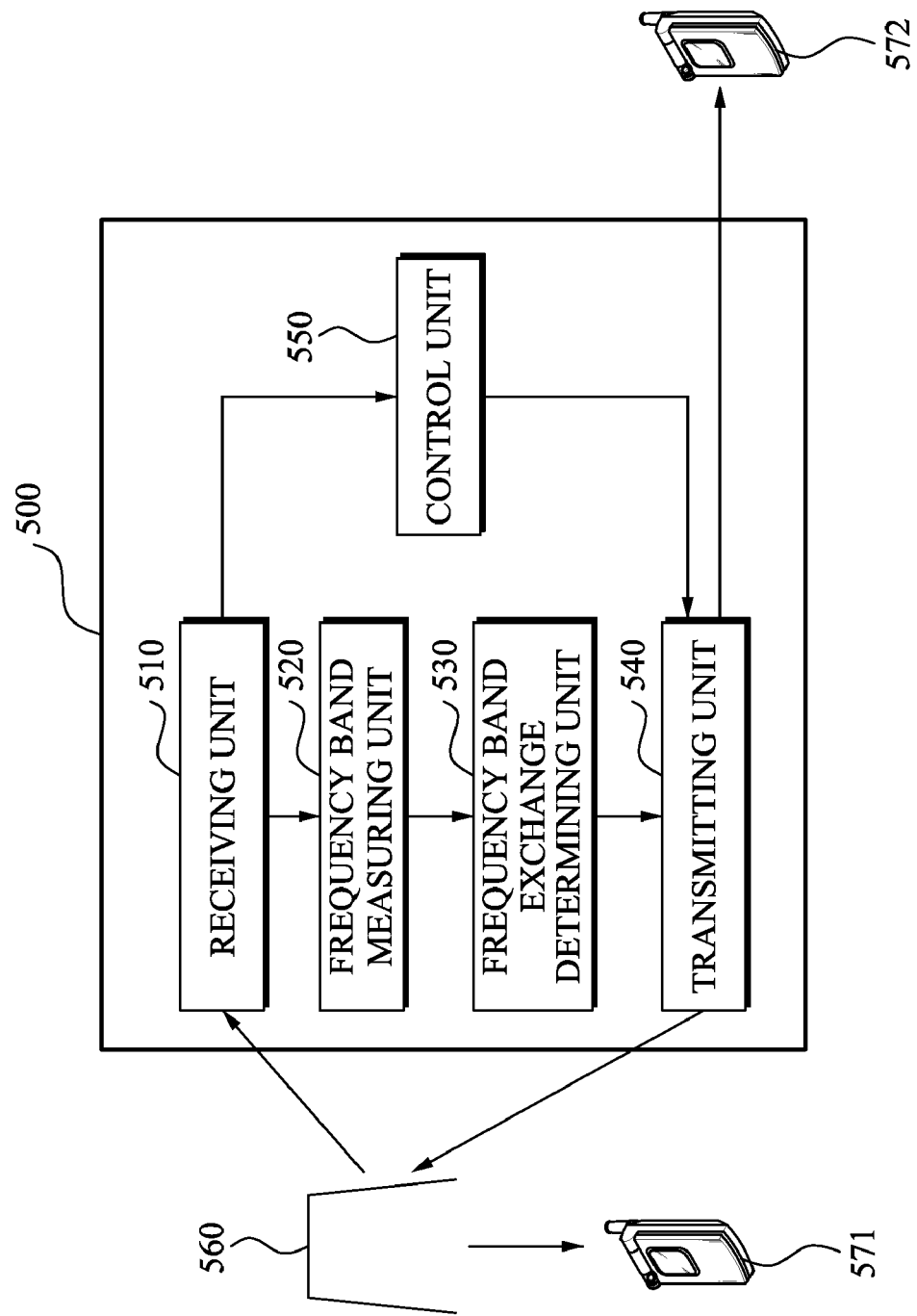
FIG. 5 is a block diagram illustrating a structure of a base station for exchanging frequency bands according to an exemplary embodiment.

FIG. 5 illustrates a base station 500 for exchanging frequency bands according to an exemplary embodiment. Operations and structures of the base station 500 will be hereinafter described with reference to FIG. 5. The base station 500 comprises a receiving unit 510, a frequency band measuring unit 520, a frequency band exchange determining unit 530, a transmitting unit 540, and a control unit 550.

As an illustration only, it is assumed that a first base station 560 transmits data to a first terminal 571 using a first frequency band, and a second base station 500 transmits data to a second terminal 572 using a second frequency band. It is assumed that the second base station 500 and the first base station 560 are located adjacent to each other, and the second base station 500 receives signals transmitted from the first base station 560. The second base station 500 may exchange the first frequency band with the second frequency band based on the signals transmitted from the first base station 560. The first base station 560 transmits data to the first terminal 571 using the second frequency band after the exchange, and the second base station 500 transmits data to the second terminal 572 using the first frequency band.

Hereinafter, for convenience of description, it is assumed that the second base station 500 is the base station for exchanging frequency bands and the first base station 560 is an adjacent base station.

The receiving unit 510 receives first quiet time duration information of the adjacent base station. According to an aspect, the adjacent base station may periodically broadcast the first quiet time duration information, and the receiving unit 510 may receive broadcast information to acquire the first quiet time duration information. According to another aspect, the adjacent base station may receive the first quiet time duration information from a base station information storage apparatus (not shown). Accordingly, the receiving unit 510 may receive broadcast information of the adjacent base station to identify the adjacent base station, and receive the first quiet time duration information of the identified adjacent base station from the base station information storage apparatus.

The frequency band measuring unit 520 may output the first frequency band measuring information with respect to the first frequency band used by the adjacent base station based on the first quiet time duration information. The adjacent base station may not transmit data during the first quiet time duration. In order to transmit data by the adjacent base station, the frequency band measuring unit 520 may output the first frequency band measuring information with respect to the first frequency band for a quiet time duration during which radio waves are not emitted. The frequency band measuring unit 520 may measure strengths of interference and noise with respect to the first frequency band during the first quiet time duration to output the first frequency band measuring information.

The frequency band exchange determining unit 530 determines whether to exchange the frequency bands with the adjacent base station based on the first frequency band measuring information. The frequency band exchange determining unit 530 may compare the first frequency band measuring information with a threshold value, and determine whether to exchange the frequency bands based on the compared result. The frequency band exchange determining unit 530 may determine whether to exchange the first frequency band and the second frequency band with each other where the strength of interference and noise of the first frequency band is less than a predetermined threshold value.

The frequency band measuring unit 520 may output second frequency band measuring information with respect to the second frequency band used by the second base station 500. The frequency band exchange determining unit 530 may compare the first frequency band measuring information and the second frequency band measuring information, and determine whether to exchange the frequency bands with each other based on the compared result.

The second base station 500 may not transmit data during a second quiet time duration. The second base station 500 may not emit radio waves in order to transmit data for the second quiet time duration. The frequency band measuring unit 520 may measure the strength of interference and noise with respect to the second frequency band, and output the second frequency band measuring information.

The frequency band exchange determining unit 530 may compare the sum of the strength of interference signals with respect to the first frequency band and the strength of noise of the first frequency band with the sum of the strength of interference signals with respect to the second frequency band and the strength of noise of the second frequency band. A frequency band alternation or the frequency band exchange determining unit 530 may determine to exchange the first frequency band with the second frequency band where a sum of the strength of interference signals with respect to the first frequency band and the strength of noise of the first frequency band is less than that of the strength of interference signals with respect to the second frequency band and the strength of noise of the second frequency band.

The second base station 500 may transmit data using a plurality of frequency bands. For example, the second base station 500 may transmit data using the second frequency band and a third frequency band. According to an exemplary embodiment, the second frequency band and third frequency band are assigned to be spaced apart from each other, and the second frequency band used by the adjacent base station may be assigned between the second and third frequency bands.

The frequency band exchange determining unit 530 may determine to exchange the first frequency band with the second frequency band where the first frequency band used by the adjacent base station and the second frequency band used by the second base station 500 are adjacent to each other, the first frequency band and the third frequency band used by the second base station 500 are adjacent to each other, and the second frequency band and the third frequency band are spaced apart from each other.

The second base station 500 may use the first frequency band and the third frequency band which are adjacent to each other. The second base station 500 may not need to maintain a guard band for dividing the first frequency band and the third frequency band. The second base station 500 may use the frequency band assigned as the guard in order to transmit data. Accordingly, a number of available frequency bands may increase without additionally assigning the frequency band, and thus the frequency utilization efficiency of a radio communication system may be improved.

The transmitting unit 540 transmits, to the adjacent base station, a request message for frequency band exchange based on the determined result of the frequency band exchange determining unit 530. The receiving unit 510 may receive a frequency band exchange message in response to the request message for frequency band exchange, and transmit data using the first frequency band based on the frequency band exchange message.

The performance of the second base station 500 may be improved where the base station exchanges the first frequency band with the second frequency band, however, may reduce the performance of the adjacent base station. The adjacent base station may receive the request message for frequency band exchange from the second base station 500, and determine whether to exchange the frequency bands with each other. According to an exemplary embodiment, the adjacent base station may determine to exchange the first frequency band with the second frequency band where the performance of the radio communication system is improved.

The request message for frequency band exchange transmitted by the second base station 500 may include the second quiet time duration information of the second base station 500. The adjacent base station may determine whether the frequency bands are exchanged with each other based on the second quiet time duration information, and generate the frequency band exchange message based on the determined result.

The adjacent base station may output second frequency band measuring information with respect to the second frequency band used by the second base station 500 during the second quiet time duration. The adjacent base station may determine whether the frequency bands are exchanged with each other based on the second frequency band measuring information.

The transmitting unit 540 transmits data to the second terminal 572 using the first frequency band where the first frequency band and the second frequency band are exchanged with each other based on the determined result of the frequency band exchange determining unit 530.

The control unit 550 may set the second quiet time duration with respect to the second frequency band used by the second base station 500, and the transmission unit 540 may not transmit data to the terminal 572 using the second frequency band during the second quiet time duration. The second base station 500 may not emit radio waves with respect to the second frequency band during the second quiet time duration. The adjacent base station may measure strength of interference signals with respect to the second frequency band and strength of noise of the second frequency band during the second quiet time duration, and generate the second frequency band measuring information. The adjacent base station may compare the first frequency band measuring information and the second frequency band measuring information to determine whether to exchange the frequency bands with each other.

The request message for frequency band exchange may include the first frequency band measuring information.

According to an exemplary embodiment, a plurality of adjacent base stations 560 may exist with respect to the base station 500. The plurality of adjacent base stations 560 may not emit radio waves during the quiet time duration where the quiet time duration between the adjacent base stations 560 is overlapped. The base station 500 may not accurately measure the strength of the interference signals with respect to a specific frequency band.

According to an aspect, the quiet time durations of the adjacent base stations 560 and 500 may be set not to be overlapped with each other.

According to an aspect, the transmission unit 540 may transmit a request message for quiet time duration information to the adjacent base station 560, and a first quiet time duration of the adjacent base station 560 may be set in response to the request message for quiet time duration information.

The request message for quiet time duration information may include second quiet time duration information of the base station 500.

Figure 6:
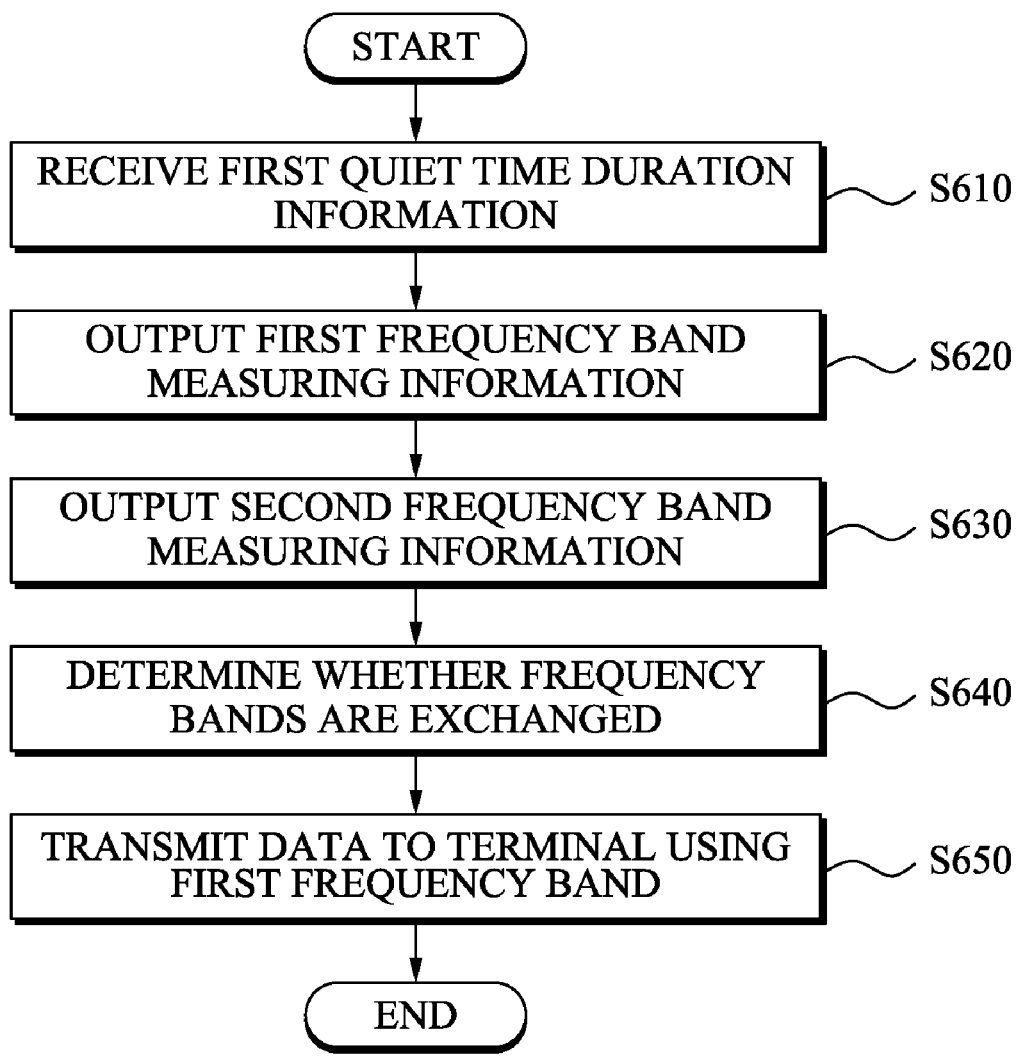
FIG. 6 is a flowchart illustrating a method for exchanging frequency bands according to an exemplary embodiment.

FIG. 6 illustrates a method for exchanging frequency bands according to an exemplary embodiment. The method for exchanging frequency bands according to an exemplary embodiment will be hereinafter described with reference to FIG. 6.

In operation S610, a base station receives first quiet time duration information of an adjacent base station. The adjacent base station transmits data to a first terminal using a first frequency band, and the base station transmits data to a second terminal using a second frequency band. The adjacent base station may not transmit data to the first terminal during a first quiet time duration. The adjacent base station may not emit radio waves to the first frequency band.

In operation S620, the base station may output first frequency band measuring information with respect to the first frequency band used by the adjacent base station based on the first quiet time duration information. In the operation S620, the base station may measure strength of interference signals with respect to the first frequency band and strength of noise of the first frequency band during the first quiet time duration. Since data signals with respect to the first frequency band may not exist during the first quiet time duration, only the strength of the interference signals and strength of the noise may accurately be measured.

In operation S630, the base station may output second frequency band measuring information with respect to the second frequency band. The second frequency band measuring information may be strength of interference signals with respect to the second frequency band and strength of noise of the second frequency band.

In operation S640, the base station may determine whether to exchange the frequency bands with each other based on the first frequency band measuring information. The base station may compare the first frequency band measuring information with a threshold value, and determine whether to exchange the frequency bands with each other based on the compared result. The first frequency band measuring information may be strength of interference signals with respect to the first frequency band and strength of noise of the first frequency band. The first frequency band may be a great frequency band for transmitting data where the first frequency band measuring information is less than a predetermined threshold value. The base station may determine to exchange the first frequency band with the second frequency band where the first frequency band measuring information is less than the predetermined threshold value.

In the operation S640, the base station may compare the first frequency band measuring information and the second frequency band measuring information to determine whether to exchange the frequency bands with each other. The first frequency band measuring information may be information about strength of interference and noise with respect to the first frequency band, and the second frequency band measuring information may be information about strength of interference and noise with respect to the second frequency band. The first frequency band may be a more suitable frequency band than the second frequency band where the strength of interference and noise with respect to the first frequency band is less than that with respect to the second frequency band. The base station may determine to exchange the first frequency band with the second frequency band where the first frequency band is more suitable than the second frequency band.

In operation S650, the base station exchanges the first frequency band with the second frequency band based on the determined result in the operation S640. The base station may transmit data to a terminal using the first frequency band where the first frequency band is exchanged with the second frequency band.

The methods and operations described above including for exchanging frequency bands may be recorded, stored, or fixed in one or more computer-readable media that includes program instructions to be implemented by a computer to case a processor to execute or perform the program instructions. The media may also include, independent or in combination with the program instructions, data files, data structures, and the like. The media and program instructions may be those specially designed and constructed for the purposes of the present invention, or they may be of the kind well-known and available to those having skill in the computer software arts. Examples of computer-readable media may include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and/or methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A base station, comprising:
   a receiving unit to receive first quiet time duration information of an adjacent base station;
   a frequency band measuring unit to determine first frequency band measuring information with respect to a first frequency band used by the adjacent base station based on the first quiet time duration information;
   a frequency band exchange-determining unit to determine whether to exchange frequency bands with each other based on the first frequency band measuring information; and
   a transmitting unit to transmit data to a terminal using the first frequency band according to the determined result.

2. The base station of claim 1, wherein the frequency band measuring unit measures strengths of interference and noise with respect to the first frequency band for a first quiet time duration.

3. The base station of claim 1, wherein the transmitting unit transmits a request message for quiet time duration information to the adjacent base station, and a first quiet time duration is set in response to the request message.

4. The base station of claim 1, wherein the frequency band exchange-determining unit compares the first frequency band measuring information with a threshold value, and determines whether to exchange the frequency bands of the base station and the adjacent base station based on the compared result.

5. The base station of claim 1, wherein the frequency band measuring unit determines second frequency band measuring information with respect to a second frequency band used by the base station, and the frequency band exchange-determining unit compares the first and second frequency band measuring information with each other to determine whether to exchange the frequency bands with each other.

6. The base station of claim 5, wherein the frequency band exchange-determining unit determines to exchange the first frequency band with the second frequency band where the first frequency band and a third frequency band are adjacent to each other, the third frequency band is being used by the base station, and the second frequency band and the third frequency band are spaced apart from each other.

7. The base station of claim 1, wherein the transmitting unit transmits, to the adjacent base station, a request message for the frequency band exchange according to the determined result, the receiving unit receives a frequency band exchange message in response to the request message for the frequency band exchange, and the transmitting unit transmits the data based on the frequency band exchange message.

8. The base station of claim 7, wherein the request message for the frequency band exchange includes second quiet time duration information of the base station, and the frequency band exchange message is generated based on the second quiet time duration information.

9. The base station of claim 1, further comprising:
a control unit to set a second quiet time duration with respect to a second frequency band used by the base station,
wherein the transmitting unit prevents data from being transmitted using the second frequency band for the second quiet time duration, to a second terminal.

10. The base station of claim 9, wherein the control unit sets the second quiet time duration in order to prevent the first quiet time duration and the second quiet time duration from being overlapped with each other.

11. A method for exchanging frequency bands, the method comprising:
receiving first quiet time duration information of an adjacent base station;
determining first frequency band measuring information with respect to a first frequency band used by the adjacent base station based on the first quiet time duration information;
determining whether to exchange frequency bands with each other based on the first frequency band measuring information; and
transmitting data to a terminal using the first frequency band according to the determined result.

12. The method of claim 11, wherein the determining comprises measuring strengths of interference and noise with respect to the first frequency band for a first quiet time duration.

13. The method of claim 11, wherein the determining whether to exchange comprises comparing the first frequency band measuring information with a threshold value, and determining whether to exchange the frequency bands of the base station and the adjacent base station according to the compared result.

14. The method of claim 11, further comprising:
determining second frequency band measuring information with respect to a second frequency band for transmitting data to the terminal,
wherein the determining whether to exchange comprises comparing the first and second frequency band measuring information with each other to determine whether to exchange the frequency bands with each other.

15. A computer-readable storage medium storing a program to operate a base station in a radio communication system, comprising instructions to cause a computer to:
receive first quiet time duration information of an adjacent base station;
determine first frequency band measuring information with respect to a first frequency band used by the adjacent base station based on the first quiet time duration information;
determine whether to exchange frequency bands with each other based on the first frequency band measuring information; and
transmit data to a terminal using the first frequency band according to the determined result.

16. A computer-readable storage medium readable by a computer, having a data frame comprising:
a data transmitting duration region to transmit first data to a first terminal using a first frequency band; and
a quiet time duration region to prevent the first data from being transmitted to the first terminal by a base station,
wherein the quiet time duration region is used for measuring strengths of interference and noise with respect to the first frequency band by an adjacent base station of the base station transmitting second data to a second terminal using a second frequency band.

17. The computer-readable storage medium of claim 16, wherein the data transmitting duration region is used to transmit the first data to the first terminal using the second frequency band by the base station according to the measured result.

* * * * *